(12) United States Patent
Sakagami et al.

(10) Patent No.: US 11,107,494 B1
(45) Date of Patent: Aug. 31, 2021

(54) DATA STORAGE DEVICE ACCESSING MAGNETIC TAPE BY ACTUATING HEAD IN TWO DIMENSIONS

(71) Applicant: Western Digital Technologies, Inc., San Jose, CA (US)

(72) Inventors: Akira Sakagami, Kanagawa (JP); Toshio Takahashi, Tokyo (JP); Kouki Uefune, Kanagawa (JP)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/716,796

(22) Filed: Dec. 17, 2019

(51) Int. Cl.
*G11B 5/584* (2006.01)
*G11B 5/008* (2006.01)
*G11B 5/55* (2006.01)
*G11B 5/48* (2006.01)

(52) U.S. Cl.
CPC ........ *G11B 5/00813* (2013.01); *G11B 5/4893* (2013.01); *G11B 5/5513* (2013.01); *G11B 5/00865* (2013.01); *G11B 5/00869* (2013.01); *G11B 5/00878* (2013.01); *G11B 5/00882* (2013.01); *G11B 5/00886* (2013.01); *G11B 5/584* (2013.01)

(58) Field of Classification Search
None
See application file for complete search history.

(56) References Cited

U.S. PATENT DOCUMENTS

| | | | |
|---|---|---|---|
| 3,443,036 A | 5/1969 | Maass | |
| 3,780,264 A | 12/1973 | Kondur, Jr. et al. | |
| 4,090,223 A | 5/1978 | Holt | |
| 5,335,250 A | 8/1994 | Dent et al. | |
| 5,719,724 A * | 2/1998 | Kawaguchi | G11B 5/0086 360/84 |
| 5,793,552 A | 8/1998 | Howell | |
| 5,828,514 A * | 10/1998 | Chliwnyj | G11B 5/5508 360/77.12 |
| 5,872,672 A * | 2/1999 | Chliwnyj | G11B 5/5508 360/53 |
| 5,930,296 A | 7/1999 | Kot | |
| 5,995,306 A * | 11/1999 | Contreras | G06F 3/0601 360/31 |
| 6,088,183 A | 7/2000 | Nelson | |
| 6,188,535 B1 | 2/2001 | Lemke et al. | |
| 6,311,259 B1 | 10/2001 | Boyer et al. | |
| 6,754,033 B1 * | 6/2004 | Argumedo | G11B 15/602 360/130.21 |
| 2003/0016467 A1 * | 1/2003 | Bui | G11B 5/584 360/77.12 |
| 2003/0123181 A1 * | 7/2003 | Hennecken | G11B 5/584 360/77.13 |
| 2004/0037202 A1 * | 2/2004 | Brommer | G11B 5/488 369/94 |
| 2009/0201603 A1 * | 8/2009 | Bui | G11B 5/584 360/77.12 |
| 2009/0201604 A1 * | 8/2009 | Harper | G11B 5/584 360/77.12 |
| 2017/0186460 A1 * | 6/2017 | Kasada | G11B 5/78 |

* cited by examiner

*Primary Examiner* — Tan X Dinh

(57) ABSTRACT

A data storage device is disclosed comprising a reel that is rotated for a first interval in order to expose a first frame of a magnetic tape to a head. The head is actuated in a first and second dimensions over the magnetic tape in order to access the first frame of the magnetic tape.

20 Claims, 9 Drawing Sheets

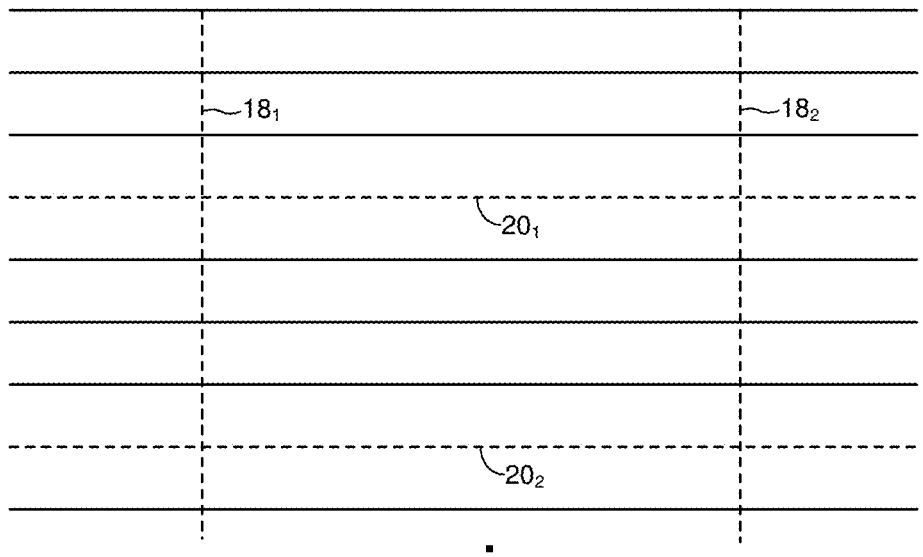
FIG. 3A
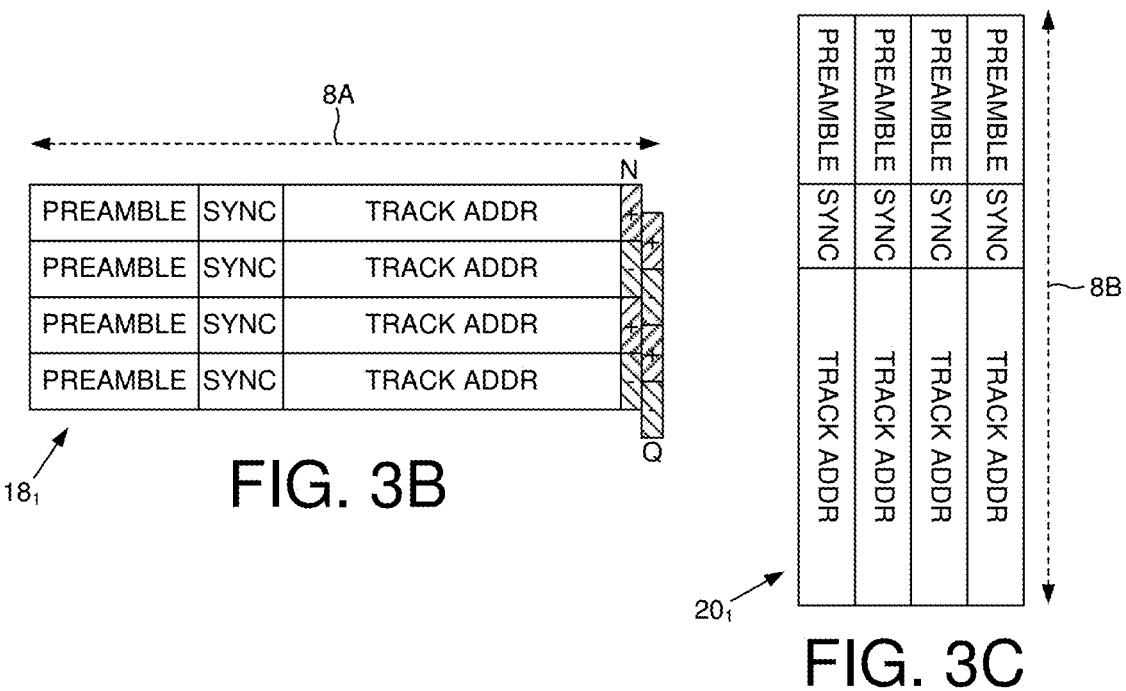
FIG. 3B
FIG. 3C
FIG. 3D

DATA STORAGE DEVICE ACCESSING MAGNETIC TAPE BY ACTUATING HEAD IN TWO DIMENSIONS

BACKGROUND

Conventional tape drive storage systems comprise a magnetic tape wound around a dual reel (reel-to-reel cartridge) or a single reel (endless tape cartridge), wherein the reel(s) are rotated in order to move the magnetic tape over one or more transducer heads during write/read operations. The format of the magnetic tape may be single track or multiple tracks that are defined linearly, diagonally, or arcuate with respect to the longitudinal dimension along the length of the tape. With a linear track format, the heads may remain stationary relative to the longitudinal dimension of the tape, but may be actuated in a vertical dimension along the width of the tape as the tape moves past the heads. With a diagonal or arcuate track format, the heads may be mounted on a rotating drum such that during access operations both the heads and tape are moved relative to one another (typically in opposite directions along the longitudinal dimension of the tape).

BRIEF DESCRIPTION OF THE DRAWINGS

FIG. 3A shows an embodiment wherein servo sectors are recorded in the two dimensions of head movement to facilitate seek operations.

FIG. 3B shows an embodiment wherein the servo sectors recorded in vertical servo wedges comprise a track address for coarse positioning during seeks, and servo bursts for fine positioning during tracking operations.

FIG. 3C shows an embodiment wherein servo sectors recorded in horizontal servo wedges comprise a track address for coarse positioning during seeks.

FIG. 3D shows an embodiment wherein the head comprises a first read element for reading the servo sectors in the first dimension, and a second read element for reading the servo sectors in the second dimension.

DETAILED DESCRIPTION

Figure 1A:
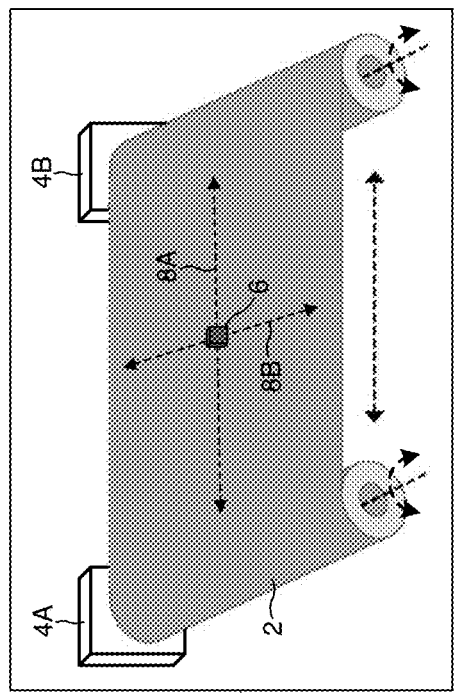
FIG. 1A shows a data storage device according to an embodiment comprising a head actuated over a magnetic tape.
Figure 1B:
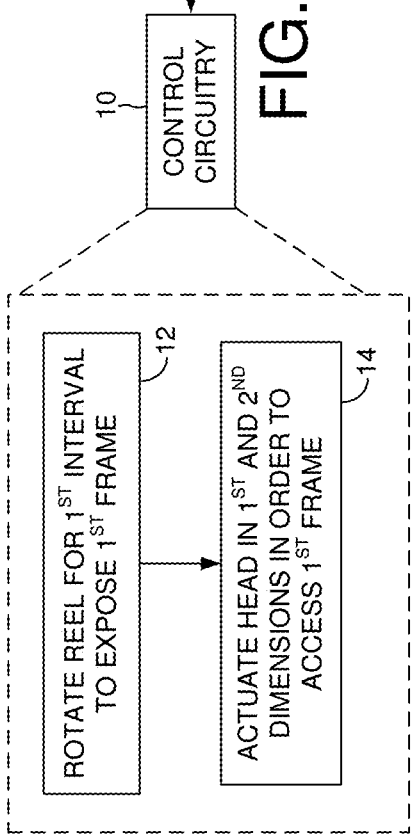
FIG. 1B is a flow diagram according to an embodiment wherein while the magnetic tape is stationary the head is actuated in two dimensions in order to access the magnetic tape.

FIG. 1A shows a data storage device comprising a magnetic tape 2, and a first actuator 4A and 4B configured to wind the magnetic tape around a reel. The data storage device further comprises a head 6 configured to access the magnetic tape 2, a second actuator configured to actuate the head 6 over the magnetic tape in a first dimension 8A, and a third actuator configured to actuate the head 6 over the magnetic tape 2 in a second dimension 8B. Control circuitry 10 of the data storage device is configured to execute the flow diagram of FIG. 1B, wherein the first actuator is controlled to rotate the reel for a first interval in order to expose a first frame of the magnetic tape to the head (block 12), and in some embodiments while the magnetic tape remains stationary, the second and third actuators are controlled to actuate the head in the first and second dimensions over the magnetic tape in order to access the first frame of the magnetic tape (block 14).

In the embodiment shown in FIG. 1A, the magnetic tape 2 is wound around two reels (reel-to-reel) using any suitable rotary actuators 4A and 4B such as a suitable electric motor. In another embodiment, the magnetic tape 2 may be wound around a single reel (endless tape) by a single rotary actuator. In the embodiment of FIG. 1A, one of the rotary actuators 4A or 4B is controlled to wind the magnetic tape 2 around a respective reel in order to move the magnetic tape in a forward or reverse direction. The rotary actuator 4A or 4B operates for a predetermined interval in order to expose the magnetic tape 2 to the head 6 a frame at a time. After the predetermined interval, the movement of the magnetic tape 2 is stopped, and the head 6 is actuated in two dimensions 8A and 8B in order to access data tracks of the current frame.

Figure 2A:
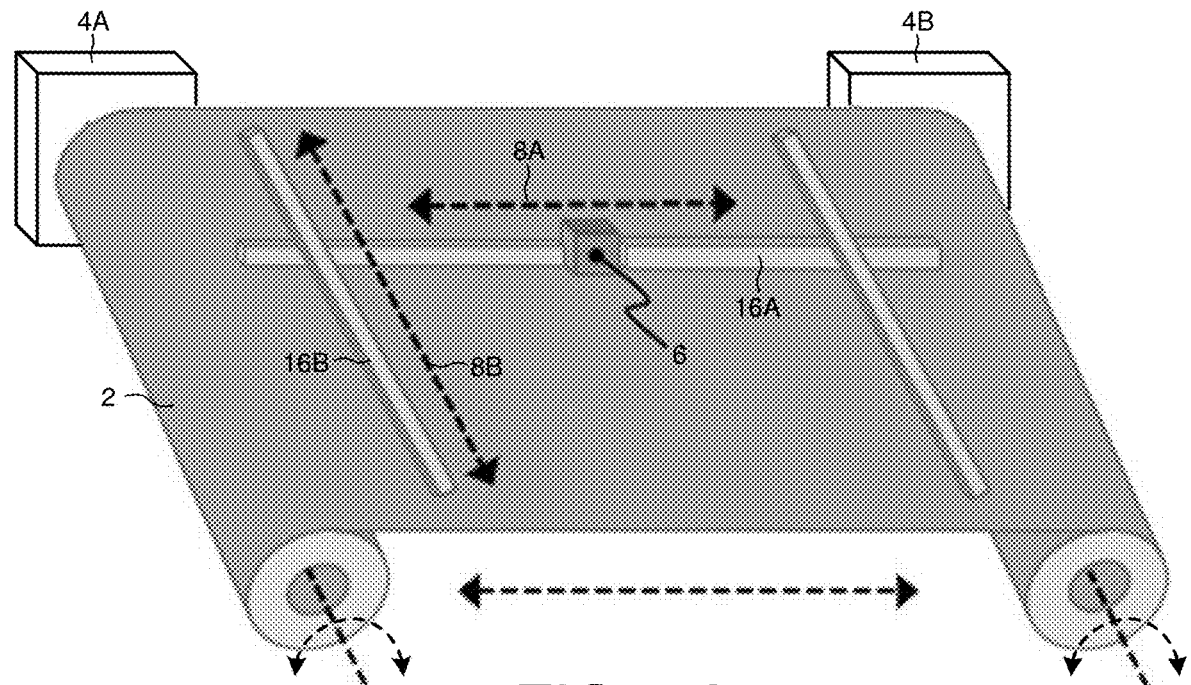
FIG. 2A shows an embodiment wherein the head is actuated in the two dimensions using respective linear actuators.

Any suitable actuators may be employed to actuate the head 6 relative to the data tracks recorded in a frame of the magnetic tape 2, including to seek the head 6 between the data tracks, as well as track a centerline of a data track during an access operation. FIG. 2A shows an embodiment wherein the second actuator comprises a linear actuator 16A configured to actuate the head 6 in a longitudinal dimension along a length of the magnetic tape 2, and the third actuator comprises a linear actuator 16B configured to actuate the head 6 in a vertical dimension along a width of the magnetic tape 2. Any suitable linear actuator may be employed, such as a lead screw actuator which may provide linear actuation by rotating the lead screw in order to actuate a nut along a length of the lead screw, or by rotating the nut about the lead screw. Any suitable actuator may be employed to rotate the lead screw or the nut, for example, a suitable stepper motor.

Figure 2B:
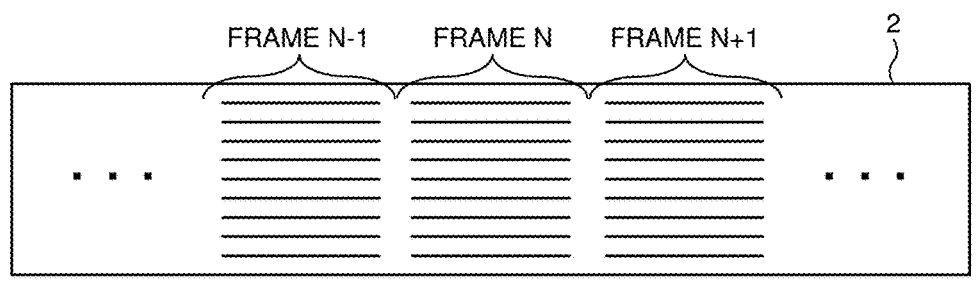
FIG. 2B shows an embodiment wherein substantially linear data tracks are written in a longitudinal dimension along a length of the magnetic tape and spaced apart in a vertical dimension along a width of the magnetic tape.

In one embodiment shown in FIG. 2B, the second and third actuators 16A and 16B are controlled to write substantially linear data tracks in a longitudinal dimension along a length of the magnetic tape 2 that are spaced apart in a vertical dimension along a width of the magnetic tape 2. The third actuator 16B is controlled to seek the head 6 to a target data track, and then the second actuator 16A is controlled to move the head 6 along the length of the data track during write/read operations. In one embodiment, each consecutive data track is written in an opposite direction from the previously written data track. For example, the first (top) data track in frame N shown in FIG. 2B may be written by moving the head 6 from left to right along the longitudinal dimension, and then the next consecutive data track (second from top) may be written by moving the head 6 from right to left along the longitudinal dimension. In this manner when writing the second data track consecutive with the first data track, the third actuator 16B need only seek the head 6 to the second data track without repositioning the head 6 to the left side of the frame N. In yet another embodiment, the head 6 may comprise multiple write elements (e.g., two write elements) that are aligned along the vertical dimension, wherein each write element may be fabricated to enable writing data in a particular direction (e.g., from right to left or from left to right in FIG. 2B). In this manner, after writing the first (top) data track in FIG. 2B using a first write element, the second data track may be written using the second write element without moving the head 6 in the vertical dimension (or after moving the head 6 a short distance in the vertical dimension to achieve a target spacing of the data tracks). After writing the second data track using the second write element, the head 6 may be actuated vertically such that the first write element is positioned over the third data track in order to continue writing consecutive data tracks.

In one embodiment, during read operations a read element of the head 6 may be moved over a data track in a forward or reverse direction. For example after writing the first (top) data track by moving the head 6 from left to right in frame N of FIG. 2B, the data track may be read by moving a read element within the head 6 over the data track from left to right (forward direction), or by moving the read element within the head 6 over the data track from right to left (reverse direction). In one embodiment, the control circuitry 10 of FIG. 1A is capable of demodulating the read signal of a data track read in the forward direction or the reverse direction. In another embodiment, when reading a data track in the reverse direction the control circuitry 10 may buffer the signal samples of the read signal in memory, and then process the signal samples in the forward direction after reading the data track (or a data sector of the data track). In yet another embodiment, the head 6 may comprise multiple read elements aligned in the vertical dimension in order to simultaneously read multiple data tracks (e.g., two read elements configured to read two adjacent data tracks of FIG. 2A) while moving the head from left to right or from right to left.

In one embodiment, a write and/or read element of the head 6 may be capable of writing/reading a data track while the head is moving in a particular direction (e.g., forward direction described above). Accordingly in on embodiment, the head 6 may comprise multiple write/read element each configured to write/read a data track in a particular direction. In yet another embodiment, the head 6 may comprise a suitable actuator configured to rotate the head 6 into a target orientation based on the direction that a data track is accessed. For example, in order to access a data track in the reverse direction, the head 6 may be rotated by 180 degrees in order to position the write/read elements into the desired orientation relative to the data track.

In one embodiment, reading a data track in the reverse direction may decrease the access latency of the head 6 during random access operations. After seeking the head 6 to a target data track as part of a random read operation, the head 6 may be moved over the data track in a reverse direction (e.g., to read a data sector in the reverse direction) rather than moving the head 6 to the start of a data sector and then reading the data track in the forward direction. In one embodiment, a sorting algorithm that sorts queued access commands into an execution order that minimizes the access latency of the head 6 may take into account the ability of the head 6 to read a data track in the reverse direction.

Figure 2C:
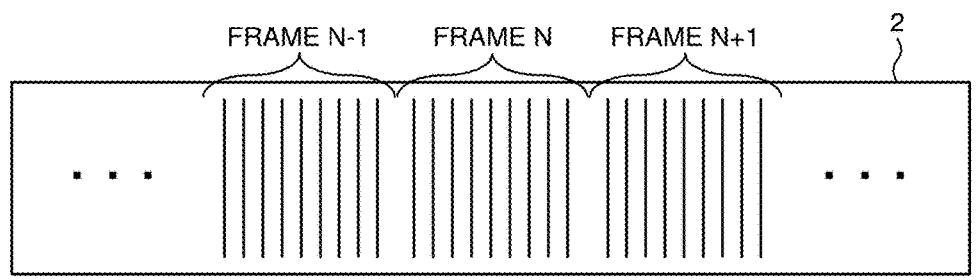
FIG. 2C shows an embodiment wherein substantially linear data tracks are written in a vertical dimension along a width of the magnetic tape and spaced apart in a longitudinal dimension along a length of the magnetic tape.

FIG. 2C shows an embodiment wherein the second and third actuators 16A and 16B are controlled to write substantially linear data tracks in the vertical dimension along the width of the magnetic tape 2 that are spaced apart in the longitudinal dimension along the length of the magnetic tape 2. That is, a data track is written in this embodiment by controlling the third actuator 16B to move the head 6 in the vertical dimension along the length of the data track while controlling the second actuator 16A to maintain the head 6 along the center of the data track (a tracking operation).

The actuators for actuating the head over a frame of the magnetic tape 2 may be controlled based on any suitable position information processed by any suitable servo control system. In one embodiment, the actuators may comprise a suitable position decoder (e.g., an optical or magnetic position decoder) configured to detect the position of the actuator and therefore the position of the head 6 relative to the magnetic tape 2. In another embodiment, servo sectors may be recorded in the frame of the magnetic tape 2 which may be read by the head 6 and demodulated into the position information processed by the servo control system. An example of this embodiment is shown in FIG. 3A wherein linear data tracks are written to the frame such as described above with reference to FIG. 2B. In this embodiment, servo sectors may be periodically written while moving the head 6 in the horizontal direction to form a plurality of horizontally spaced vertical servo wedges (e.g., servo wedges $18_1$ and $18_2$), and servo sectors may be periodically written while moving the head in the vertical direction to a form a plurality of vertically spaced horizontal servo wedges (e.g., servo wedges $20_1$ and $20_2$). In one embodiment, each horizontal servo wedge 20 may be written in a gap between consecutively written horizontal data tracks. Each servo sector in the vertical servo wedges (e.g., servo wedges $18_1$ and $18_2$) may comprise any suitable servo fields, such as a preamble, sync mark, track address, and servo bursts (e.g., amplitude or N/Q phase-based servo bursts) such as shown in FIG. 3B, wherein the track address may provide coarse positioning information used for seeking the head across the frame, and the servo bursts may provide fine positioning information for tracking the head along a centerline of a data track during write/read operations. In one embodiment, each servo sector in the horizontal servo wedges (e.g., servo wedges $20_1$ and $20_2$) may comprise a track address for coarse position information during seeks, with no servo burst field since there is no tracking operation in the vertical direction such as shown in FIG. 3C. In one embodiment, the track address in the servo sectors of each horizontal servo wedge 20 are all the same since it represents the address of a horizontal track (the vertical position of the head 6 relative to the magnetic tape 2).

The servo sectors in the vertical and horizontal servo wedges such as shown in FIGS. 3B and 3C may be written to the magnetic tape in any suitable manner. In one embodiment, the servo sectors may be written using an external servo writer prior to installing the magnetic tape 2 into the data storage device. In one embodiment, an external servo writer may actuate a head over the magnetic tape when writing the servo sectors, and in another embodiment, an external servo writer may employ a magnetic stamping technique in order to "stamp" the servo sectors onto the surface of the magnetic tape 2. In another embodiment, the servo sectors may be self-servo written by the control circuitry 10 after installing the magnetic tape 2 into the data storage device. That is, the control circuitry 10 may control the second and third actuators in order to move the head 6 over the magnetic tape 2 while writing the servo sectors. Any suitable self-servo writing technique may be employed, such as by writing seed servo patterns open-loop (e.g., diagonal seed servo patterns) and then servoing off of the seed servo patterns closed-loop in order to write the final servo sectors to the magnetic tape 2.

FIG. 3D shows an embodiment wherein the head 6 may comprise a first read element $22_1$ configured to read the servo sectors in the vertical servo wedges as well as read the data recorded in the data tracks, and a second read element $22_2$ configured to read the servo sectors in the horizontal servo wedges. When seeking the head 6 vertically over the magnetic tape 2 toward a target data track, the control circuitry 10 demodulates the read signal emanating from the second read element $22_2$ when reading the servo sectors in the horizontal servo wedges in order to measure a vertical position of the head 6 relative to the data tracks. When the head 6 reaches the target data track, the control circuitry 10 moves the head in the horizontal direction and demodulates the read signal emanating from the first read element $22_1$ when reading the servo sectors in the vertical servo wedges in order to measure a horizontal position of the head 6 relative to the data track (e.g., relative to data sectors recorded in the data track). The control circuitry 10 also measures a vertical position of the head by reading the servo sectors in the vertical servo wedges in order to maintain the head 6 along a centerline of the target data track in a tracking operation while accessing the data track (write/read operations).

In one embodiment, while seeking the head 6 vertically over the magnetic tape 2 based on the horizontal servo wedges, the control circuitry 10 may concurrently move the head 6 in the horizontal direction open-loop in order to reduce the access latency of the head 6. That is, the control circuitry 10 may move the head 6 horizontally during a seek operation so that the head 6 is closer to a target data sector when the head 6 reaches the target data track. In one embodiment, the control circuitry 10 may move the head horizontally during a seek operation at a speed corresponding to the length of the seek and the horizontal distance of the head 6 from the target data sector. That is, the control circuitry 10 may move the head horizontally at a speed that ensures the head 6 will arrive at the target data track just prior to the head 6 reaching the target data sector (just-in-time (JIT) seek). In one embodiment, the horizontal servo wedges (e.g., servo wedges $20_1$ and $20_2$ in FIG. 3A) may overwrite the vertical servo wedges (e.g., servo wedges $18_1$ and $18_2$ in FIG. 3A) so that the vertical servo wedges do not interfere with reading the horizontal servo wedges during a seek operation in the event the head 6 passes over the intersection of the two servo wedges during the seek.

In one embodiment, the head 6 may comprise a first write element configured to write the servo sectors in the horizontal direction (to form the vertical servo wedges), and a second write element configured to write the servo sectors in the vertical direction (to form the horizontal servo wedges). That is, in one embodiment the head 6 may comprise first and second write elements that are aligned relative to the direction of writing similar to having first and second read elements as shown in FIG. 3D that are aligned relative to the direction of reading.

Figure 3E:
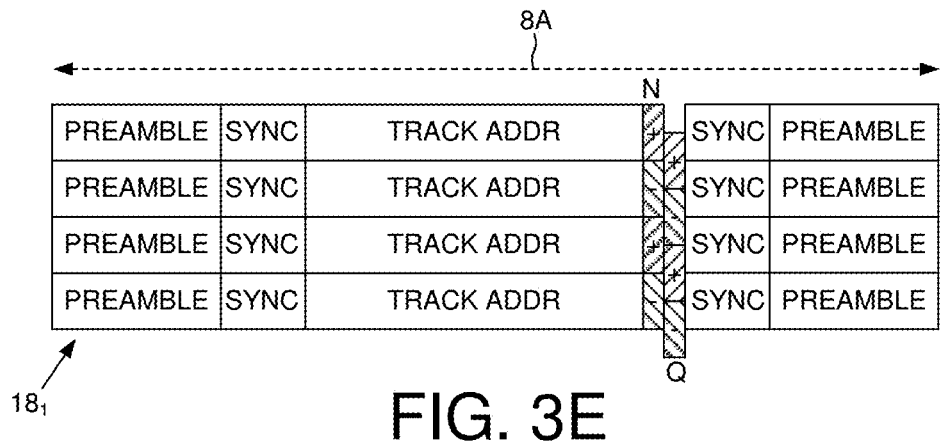
FIG. 3E shows an embodiment wherein a preamble and sync mark are recorded at the beginning and end of each servo sector in a vertical servo wedge to facilitate reading the servo sectors while the head is moving in either horizontal direction.
Figure 3F:
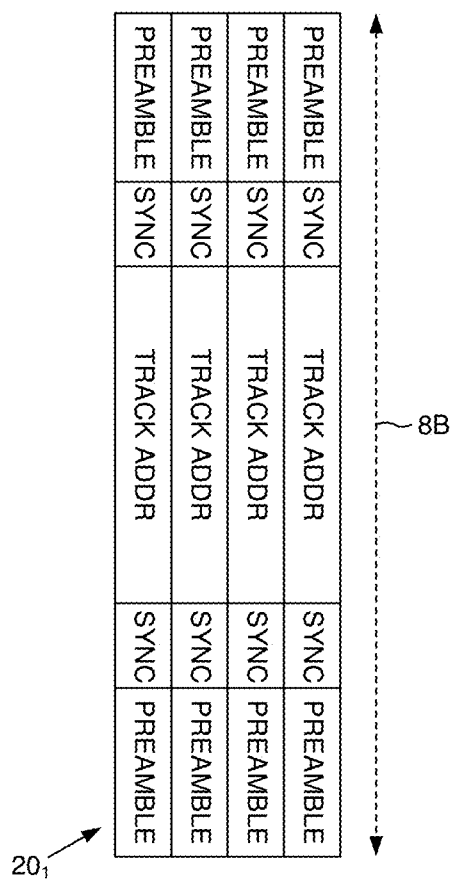
FIG. 3F shows an embodiment wherein a preamble and sync mark are recorded at the beginning and end of each servo sector in a horizontal servo wedge to facilitate reading the servo sectors while the head is moving in either vertical direction.

FIG. 3E shows an embodiment wherein a preamble and sync mark are recorded at the beginning and end of each servo sector in a vertical servo wedge $18_1$ to facilitate synchronizing to the servo sectors while moving the head in either horizontal direction (right-to-left or left-to-right) during an access operation. Similarly as shown in FIG. 3F, a preamble and sync mark may be recorded at the beginning and end of each servo sector in a horizontal servo wedge $20_1$ to facilitate synchronizing to the servo sectors while moving the head in either vertical direction (top-to-bottom or bottom-to-top) during a seek operation. In one embodiment, a preamble and sync mark may be recorded at the beginning and end of each data sector recorded in a horizontal data track to facilitate synchronizing to the data sectors during read operations while moving the head in either horizontal direction.

Figure 3G:
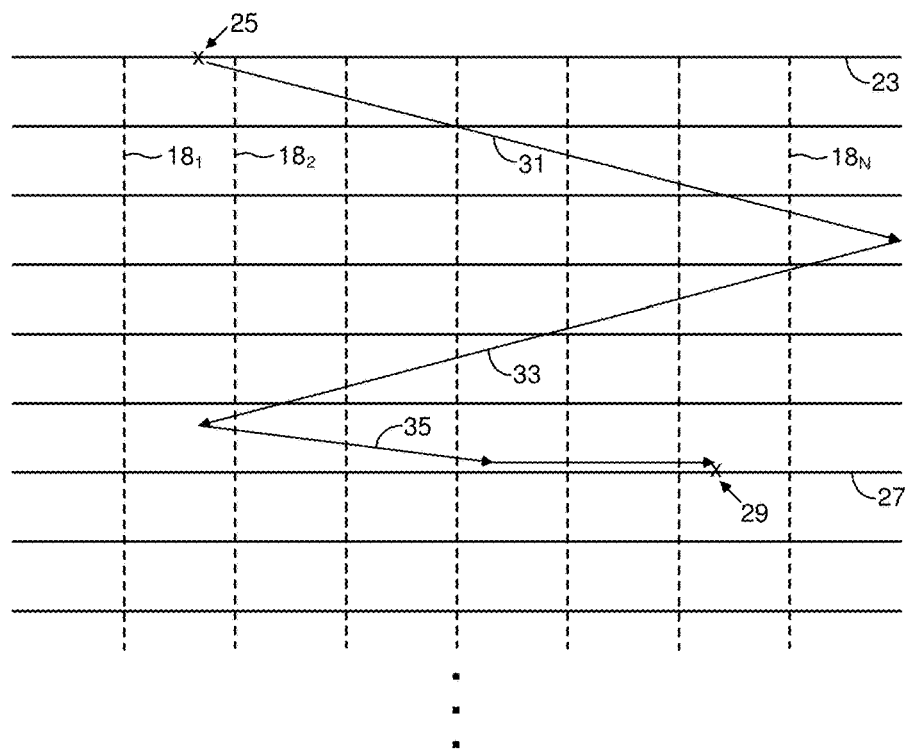
FIG. 3G shows an embodiment wherein a frame of the magnetic tape may comprise vertical servo wedges that facilitate seek operations by moving the head concurrently in both dimensions.

FIG. 3G shows an embodiment wherein a frame of the magnetic tape 2 comprises vertical servo wedges $18_1$-$18_N$ as described above without horizontal servo wedges such as shown in FIG. 3A. In this embodiment, a seek operation may be executed by moving the head concurrently in both dimensions (horizontal and vertical), wherein the head 6 is moved at a "read velocity" in the horizontal direction in order to read the servo sectors recorded in the vertical servo wedges. When the length of a seek is relatively long, the seek operation may be executed by performing a "zig zag" seek across the frame. FIG. 3G shows an example of a "zig zag" seek wherein the head 6 seeks from a current data track 23 at data sector 25 to data track 27 and data sector 29. The head 6 first moves along trajectory 31, then trajectory 33, then trajectory 35 until reaching the target data track 27.

Figure 3H:
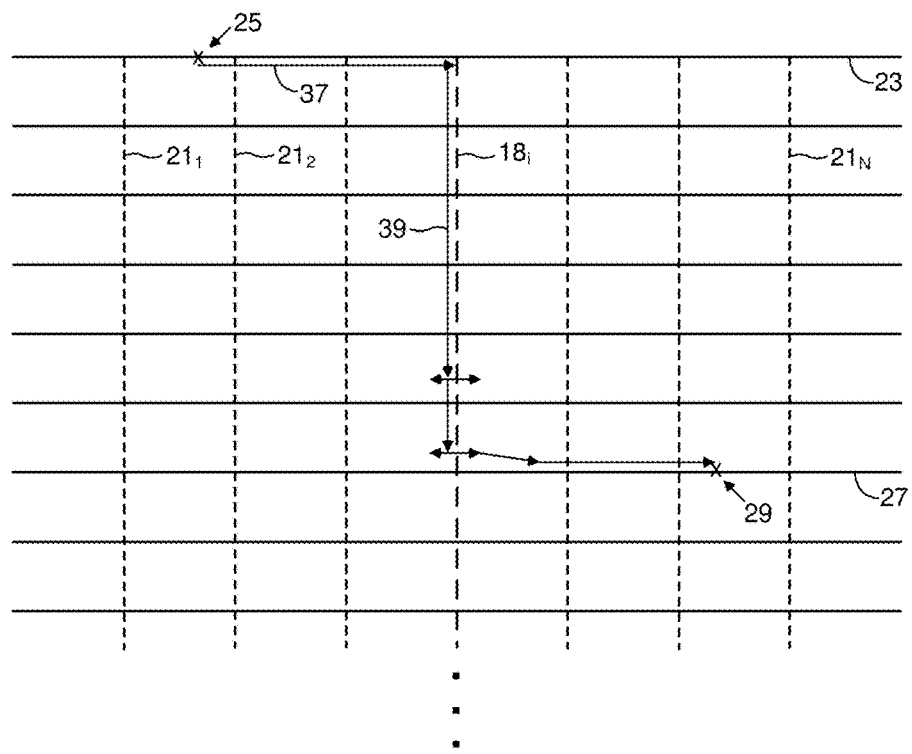
FIG. 3H shows an embodiment wherein a frame of the magnetic tape may comprise an index vertical servo wedge that facilitates seek operations and additional mini vertical servo wedges that facilitate seek settling and tracking operations.

FIG. 3H shows an embodiment wherein a frame of the magnetic tape 2 comprises an index vertical servo wedge 18*i* that facilitates seek operations, and mini vertical servo wedges 21$_1$-21$_N$ that facilitate seek settling and tracking operations. In one embodiment, each servo sector in the index vertical servo wedge 18*i* comprises a track address and servo bursts similar to FIG. 3B, whereas each servo sector in a mini vertical servo wedge 21$_1$-21$_N$ comprises servo bursts (without a track address). In order to seek from data sector 25 to data sector 29, the head 6 is first moved closed-loop along trajectory 37 until reaching the index vertical servo wedge 18*i*. The head is then moved open-loop toward data track 27 along trajectory 39. When the head 6 nears data track 27, the head 6 is moved horizontally over the index vertical servo wedge 18*i* in order to read the track address and determine the vertical location of the head 6. The head 6 is then moved incrementally toward data track 27 and the track address in the index vertical servo wedge 18*i* is read until the head 6 is sufficiently near data track 27, at which time the head 6 is moved horizontally toward data sector 29 while reading the mini vertical servo wedges in order to settle the head 6 onto, and track the centerline, of the data track 27.

In one embodiment, the head 6 may be actuated over a frame of the magnetic tape 2 using a dedicated servo frame recorded on the opposite side of the magnetic tape, or recorded on a different magnetic surface. For example, in one embodiment a segment of magnetic tape may be located above the surface of magnetic tape 2, and a dedicated servo head may be actuated over the dedicated servo frame. The recording head 6 for accessing a frame of the magnetic tape 2 may be coupled to a first suspension that biases the recording head 6 toward the magnetic tape 2, and a dedicated servo head may be coupled to a second suspension that biases the servo head toward the dedicated servo frame. The actuators are configured to concurrently move both the recording head 6 and the servo head during seek and tracking operations, wherein the servo head reads servo information from the dedicated servo frame in order to generate a position error signal used to servo both heads.

Figure 4A:
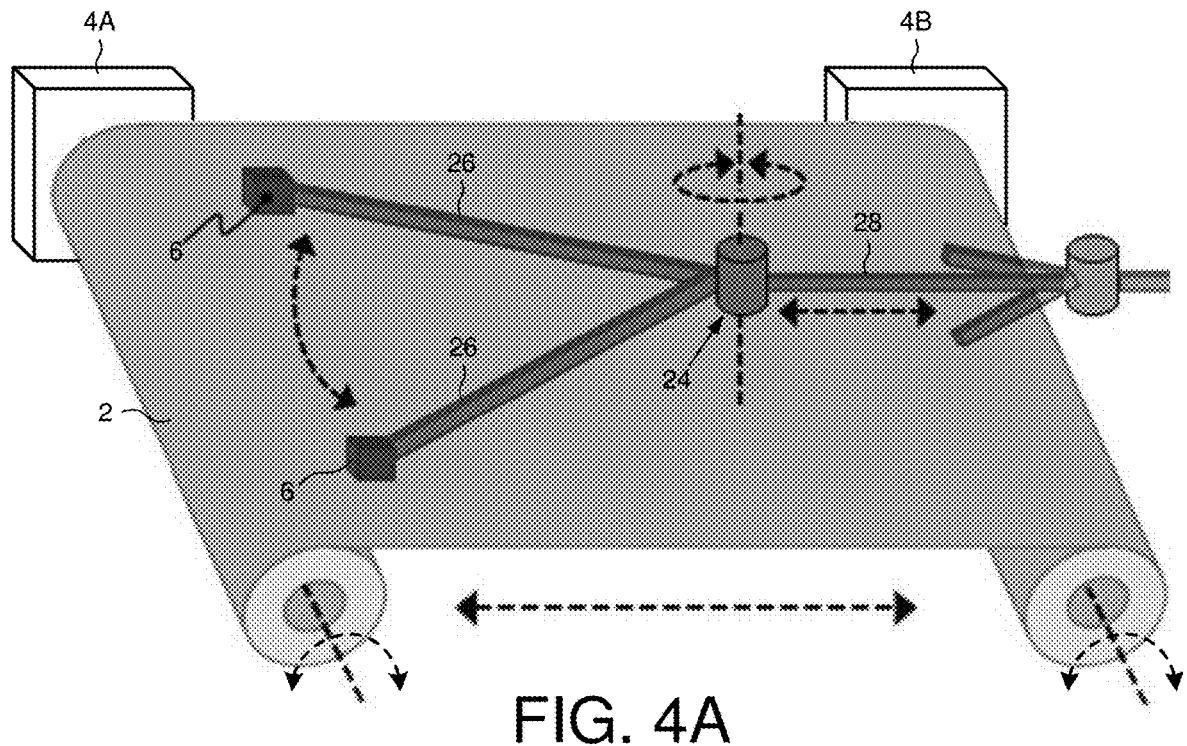
FIG. 4A shows an embodiment wherein the head is actuated in a longitudinal dimension by a linear actuator and actuated in a vertical dimension by a rotary actuator such as a voice coil motor (VCM).
Figure 4B:
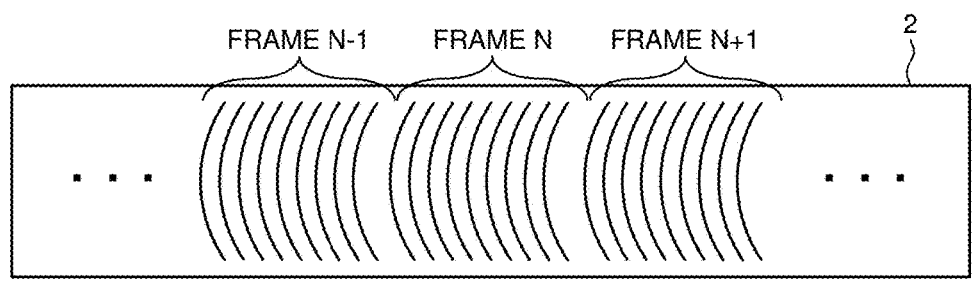
FIG. 4B shows an embodiment wherein substantially arcuate data tracks are written to the magnetic tape, wherein an arc of each data track is written along a vertical dimension and the data tracks are spaced apart along a longitudinal dimension.
Figure 4C:
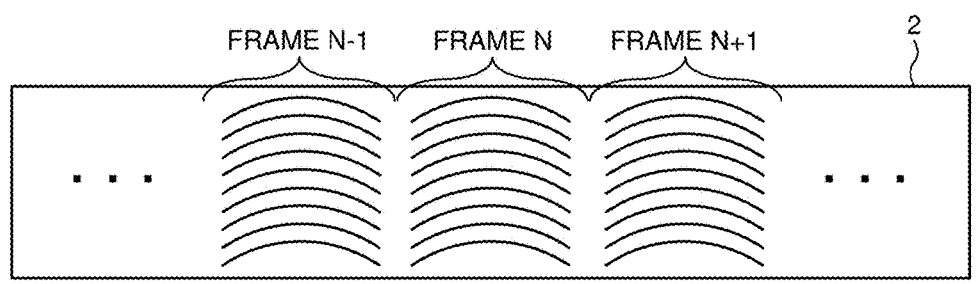
FIG. 4C shows an embodiment wherein substantially arcuate data tracks are written to the magnetic tape, wherein an arc of each data track is written along a longitudinal dimension and the data tracks are spaced apart along a vertical dimension.

FIG. 4A shows an embodiment wherein the data storage device comprises a rotary actuator 24 such as a voice coil motor (VCM) configured to rotate an actuator arm 26 about a pivot in order to actuate the head 6 vertically over the magnetic tape 2 to write arcuate data tracks. The data storage device further comprises a linear actuator 28 configured to move the rotary actuator 24 in the horizontal dimension in order to move the head 6 in the horizontal dimension over the magnetic tape 2. FIG. 4B shows an embodiment wherein actuating the head 6 over the magnetic tape 2 as shown in FIG. 4A results in arcuate data tracks being written in a frame, wherein an arc of each data track is written along the vertical dimension and the data tracks are spaced apart along the horizontal dimension. In this embodiment, the linear actuator 28 is controlled to seek the head 6 horizontally over the magnetic tape 2, and the rotary actuator 24 is controlled to move the head 6 along the length of a target data track during an access operation. In another embodiment, the linear actuator 28 may be configured to actuate the rotary actuator 24 in the vertical dimension in order to move the head 6 in the vertical dimension over the magnetic tape 2, and the rotary actuator 24 may be controlled to write arcuate data tracks along the horizontal dimension that are spaced apart along the vertical dimension as shown in FIG. 4C. In one embodiment, servo sectors may be written in two-dimensional servo wedges similar to the embodiment described above with reference to FIG. 3A. For example in the embodiment of FIG. 4A, a servo sector in a horizontal servo wedge may be written by controlling the linear actuator 28, and a servo sector in a vertical (arcuate) servo wedge may be written by controlling the rotary actuator 24.

Figure 5A:
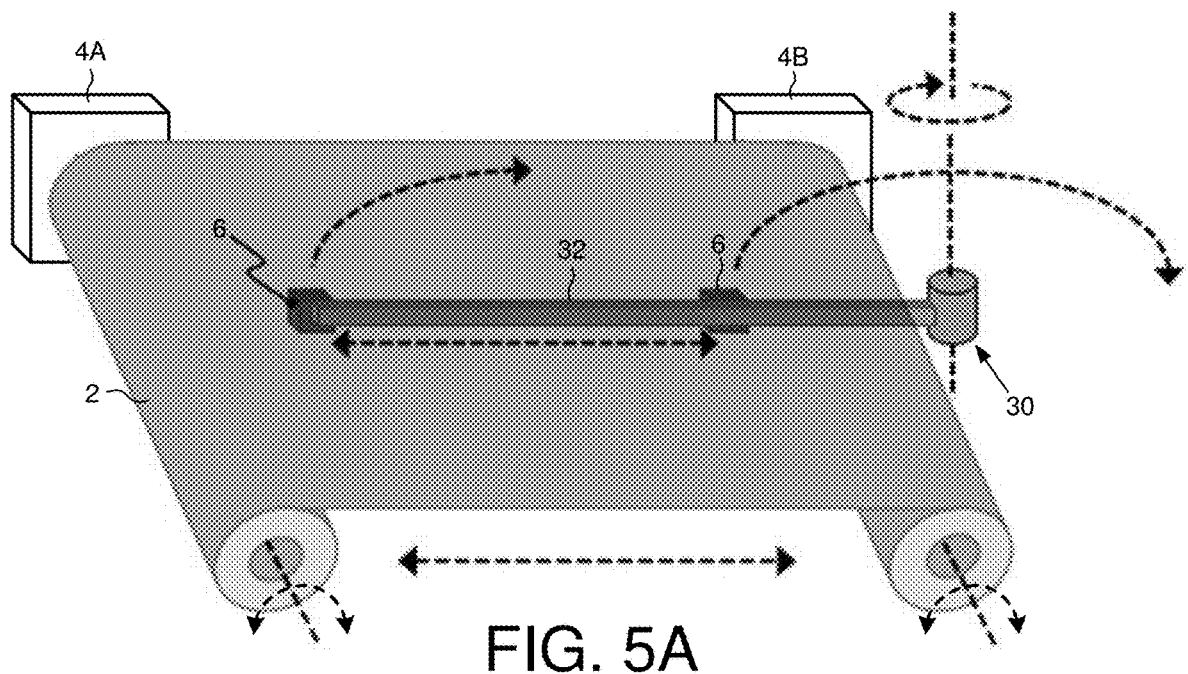
FIG. 5A shows an alternative embodiment wherein the head is actuated in a longitudinal dimension by a linear actuator and actuated in a vertical dimension by a rotary actuator such as a voice coil motor (VCM).
Figure 5B:
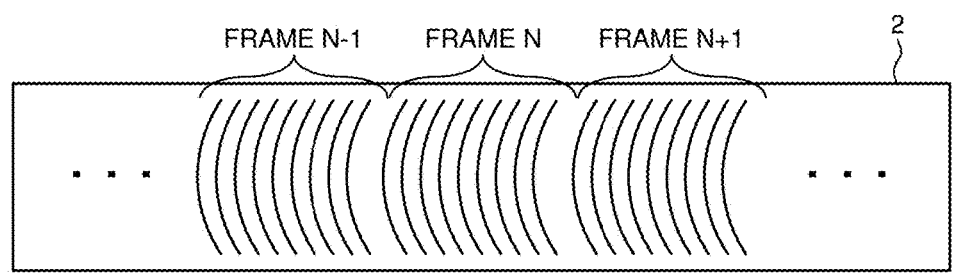
FIG. 5B shows an embodiment wherein substantially arcuate data tracks are written to the magnetic tape, wherein an arc of each data track is written along a vertical dimension and the data tracks are spaced apart along a longitudinal dimension.
Figure 5C:
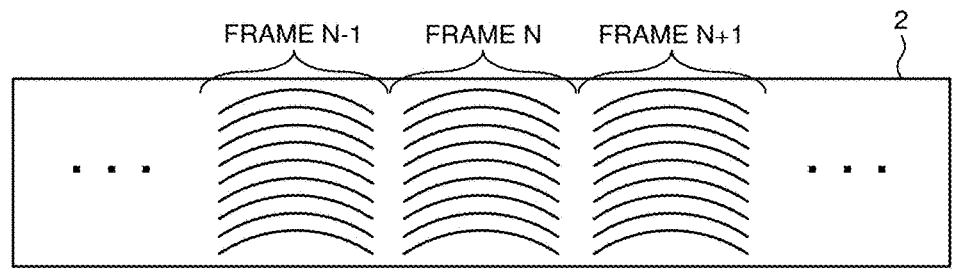
FIG. 5C shows an embodiment wherein substantially arcuate data tracks are written to the magnetic tape, wherein an arc of each data track is written along a longitudinal dimension and the data tracks are spaced apart along a vertical dimension.

FIG. 5A shows an embodiment wherein the data storage device comprises a rotary actuator 30 such as a voice coil motor (VCM) configured to rotate an actuator arm about a pivot in order to actuate the head 6 vertically over the magnetic tape 2 to write arcuate data tracks. The data storage device further comprises a linear actuator 32 configured to move the head 6 in the horizontal dimension over the magnetic tape 2. FIG. 5B shows an embodiment wherein actuating the head 6 over the magnetic tape 2 as shown in FIG. 5A results in arcuate data tracks being written in a frame, wherein an arc of each data track is written along the vertical dimension and the data tracks are spaced apart along the horizontal dimension. In this embodiment, the linear actuator 32 is controlled to seek the head 6 horizontally over the magnetic tape 2, and the rotary actuator 30 is controlled to move the head 6 along the length of a target data track during an access operation. In another embodiment, the linear actuator 32 may be configured to move the head 6 in the vertical dimension over the magnetic tape 2, and the rotary actuator 30 may be controlled to write arcuate data tracks along the horizontal dimension that are spaced apart along the vertical dimension as shown in FIG. 5C. In one embodiment, servo sectors may be written in two-dimensional servo wedges similar to the embodiment described above with reference to FIG. 3A. For example in the embodiment of FIG. 5A, a servo sector in a horizontal servo wedge may be written by controlling the linear actuator 32, and servo sector in a vertical (arcuate) servo wedge may be written by controlling the rotary actuator 30.

Figure 6A:
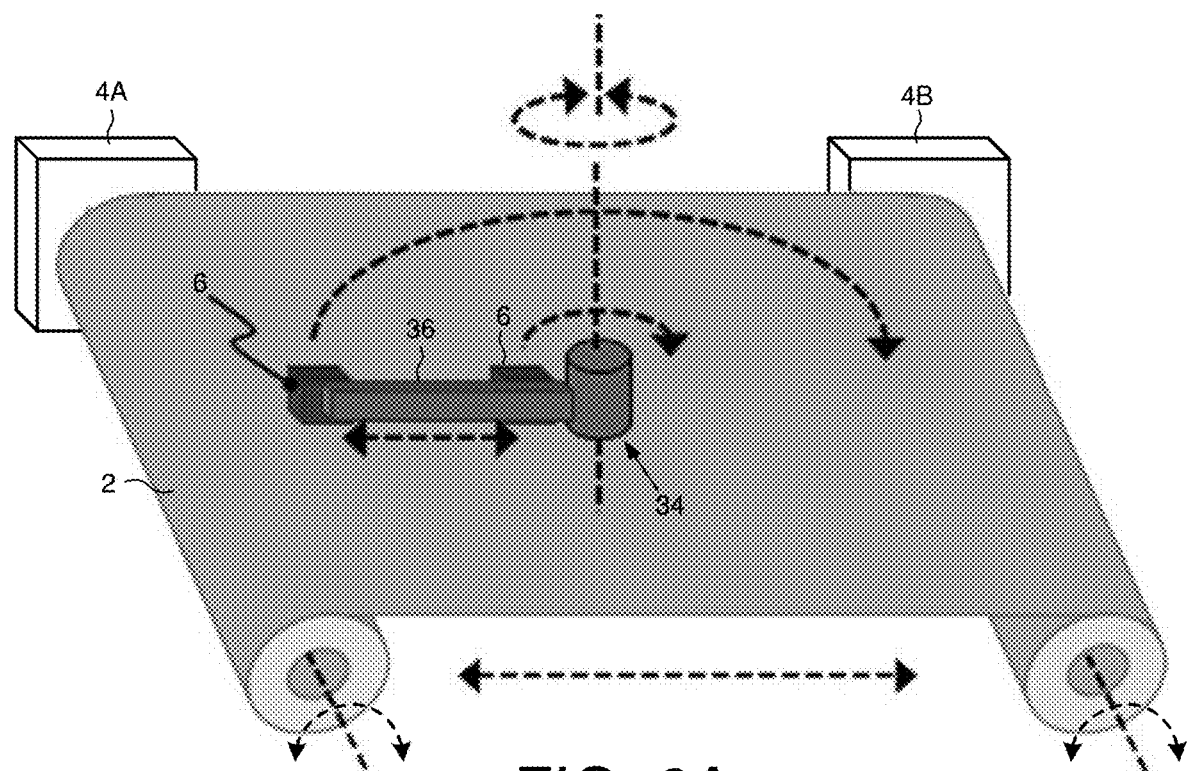
FIG. 6A shows an embodiment wherein the head is actuated in a radial dimension by a linear actuator and actuated in a circumferential dimension by a rotary actuator such as a voice coil motor (VCM).
Figure 6B:
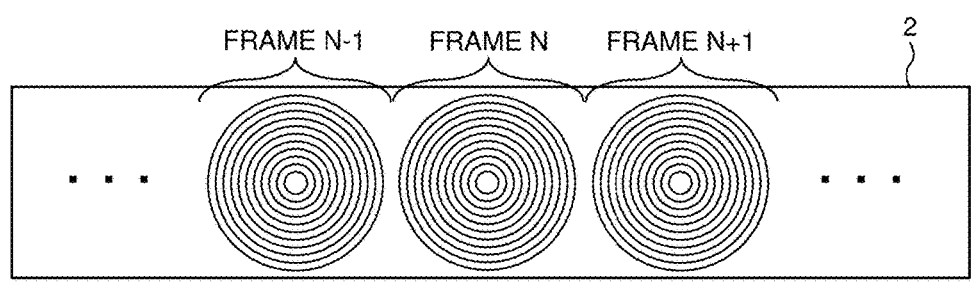
FIG. 6B shows an embodiment wherein substantially concentric data tracks are written to the magnetic tape.

FIG. 6A shows an embodiment wherein the data storage device comprises a rotary actuator 34 such as a stepper motor configured to rotate an actuator arm about a pivot in order to actuate the head 6 circumferentially over the magnetic tape 2 to write concentric data tracks. The data storage device further comprises a linear actuator 36 configured to move the head 6 in the radial dimension over the magnetic tape 2 relative to the concentric data tracks. FIG. 6B shows an embodiment wherein actuating the head 6 over the magnetic tape 2 as shown in FIG. 6A results in concentric data tracks being written in a frame. In this embodiment, the linear actuator 36 is controlled to seek the head 6 radially over the magnetic tape 2, and the rotary actuator 34 is controlled to move the head 6 along the length of a target data track during an access operation. In one embodiment, servo sectors may be written in two-dimensional servo wedges similar to the embodiment described above with reference to FIG. 3A. For example, a servo sector in a concentric servo wedge may be written by controlling the linear actuator 36 in order to write the servo sector orthogonal to the data tracks, and a servo sector in a radial servo wedge may be written by controlling the rotary actuator 34 in order to write the servo sector aligned with the data tracks. In another embodiment, a seek operation may be performed by concurrently rotating the head 6 around the data tracks while moving the head 6 in the radial direction and reading the servo sectors in radial servo wedges.

In one embodiment, the rotary actuator 34 may actuate the head 6 circumferentially while the linear actuator 36 may concurrently actuate the head 6 linearly (e.g., from an outer edge of the frame to an inner center of the frame) so as to write a spiral data track to the frame. In some embodiments, writing a spiral data track to the frame may facilitate the writing of sequential data, such as writing a sequential data stream or in data backup applications.

Figure 7:
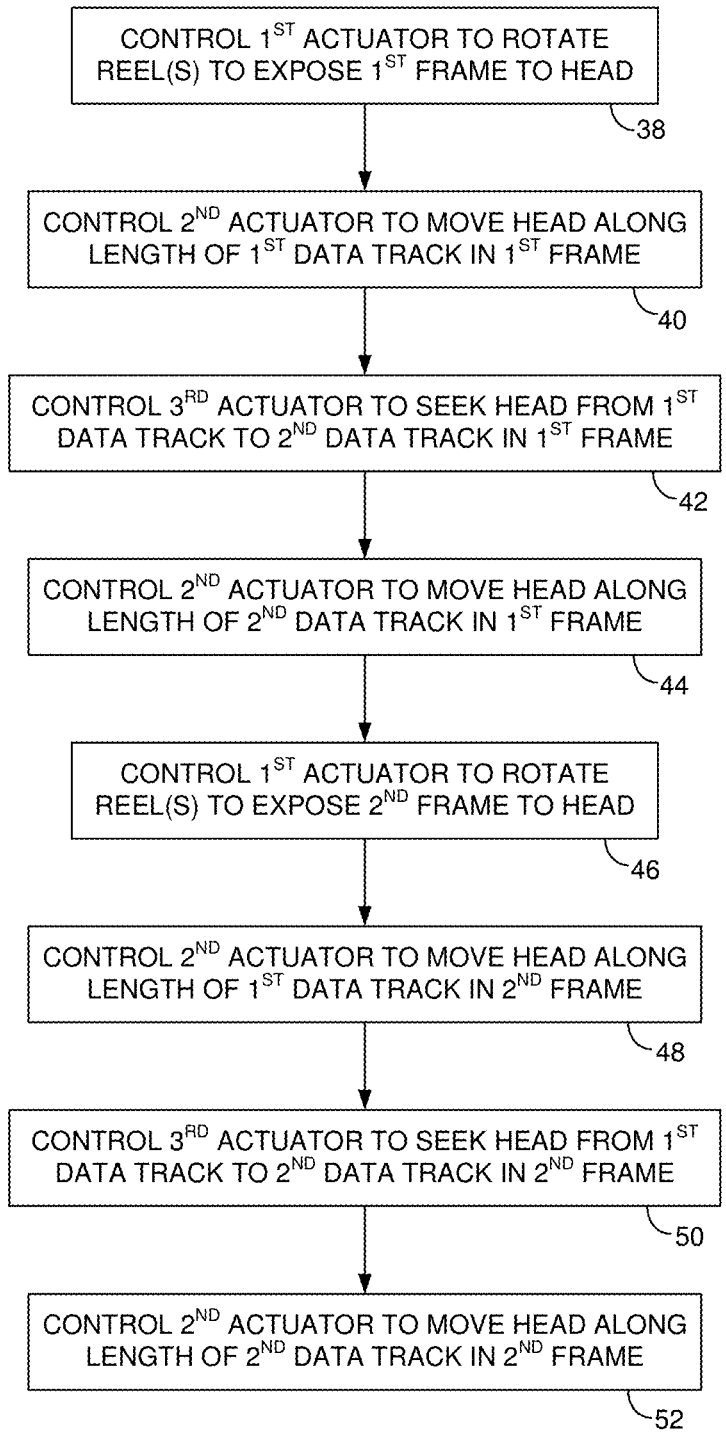
FIG. 7 is a flow diagram according to an embodiment wherein a first actuator rotates a reel to expose the head to a first frame of the magnetic tape, a second actuator moves the head along a length of a first data track in order to access the first data track in the first frame, and a third actuator seeks the head from the first data track to a second data track in the first frame.

FIG. 7 is a flow diagram according to an embodiment wherein a first actuator (e.g., rotary actuator 4A or 4B in FIG. 2A) is controlled to rotate a reel in order to expose a first frame of the magnetic tape to the head (block 38). A second actuator (e.g., linear actuator 16A) is controlled to move the head along a length of a first data track in the first frame in order to access the first data track (block 40). A third actuator (e.g., linear actuator 16B) is controlled to seek the head from the first data track to a second data track in the first frame (block 42). The second actuator is controlled to move the head along a length of the second data track in the first frame in order to access the second data track (block 44). The first actuator is controlled to rotate the reel in order to expose a second frame of the magnetic tape to the head (block 46). The second actuator is controlled to move the head along a length of a first data track in the second frame in order to access the first data track (block 48). The third actuator is controlled to seek the head from the first data track to a second data track in the second frame (block 50). The second actuator is controlled to move the head along a length of the second data track in the second frame in order to access the second data track (block 52).

In one embodiment, the data storage device may comprise multiple heads that may be actuated over respective segments of a frame on the magnetic tape 2 in order to increase the throughput by reducing the access latency. Referring for example to the embodiment of FIG. 2A, an additional head may be actuated horizontally over the magnetic tape using an additional linear actuator (parallel to linear actuator 16A). In this embodiment, the first head may be actuated to access a first half of the frame (e.g., top half in FIG. 2B or left half in FIG. 2C), and the second head may be actuated to access a second half of the frame (e.g., bottom half in FIG. 2B or right half in FIG. 2C). In this manner, the maximum seek distance for each head is half the frame rather than the full frame.

In the embodiments described above, the head 6 may be actuated in coarse movements by a primary actuator (e.g., a linear or rotary actuator), and actuated in fine movements using a secondary actuator, such as a suitable piezoelectric or thermal actuator for actuating the head in fine movements over the magnetic tape. In an embodiment employing multiple heads, actuating each head with a secondary actuator may enable the concurrent tracking of each head to allow concurrent access of respective data tracks.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one embodiment, the read channel and data storage controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or data storage controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In yet another embodiment, the control circuitry comprises suitable logic circuitry, such as state machine circuitry. In some embodiments, at least some of the flow diagram blocks may be implemented using analog circuitry (e.g., analog comparators, timers, etc.), and in other embodiments at least some of the blocks may be implemented using digital circuitry or a combination of analog/digital circuitry.

In addition, any suitable electronic device, such as computing devices, data server devices, media content storage devices, etc. may comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
   a magnetic tape;
   at least one reel;
   a first actuator configured to wind the magnetic tape around the reel;
   a first head configured to access the magnetic tape;
   a second actuator configured to actuate the first head over the magnetic tape in a first dimension;
   a third actuator configured to actuate the first head over the magnetic tape in a second dimension; and
   control circuitry configured to:

control the first actuator to rotate the reel for a first interval in order to expose a first frame of the magnetic tape to the first head; and while the magnetic tape remains stationary, control the second and third actuators to actuate the first head in the first and second dimensions over the magnetic tape in order to access the first frame of the magnetic tape.

2. The data storage device as recited in claim 1, wherein the first dimension is a longitudinal dimension along a length of the magnetic tape and the second dimension is a vertical dimension along a width of the magnetic tape.

3. The data storage device as recited in claim 2, wherein while the magnetic tape remains stationary, the control circuitry is further configured to control the second and third actuators to write a plurality of substantially linear data tracks in the first frame, wherein each data track is written along the longitudinal dimension and the data tracks are spaced apart along the vertical dimension.

4. The data storage device as recited in claim 2, wherein while the magnetic tape remains stationary the control circuitry is further configured to control the second and third actuators to write a plurality of substantially linear data tracks in the first frame, wherein each data track is written along the vertical dimension and the data tracks are spaced apart along the longitudinal dimension.

5. The data storage device as recited in claim 2, wherein while the magnetic tape remains stationary the control circuitry is further configured to control the second and third actuators to write a plurality of substantially arcuate data tracks in the first frame, wherein an arc of each data track is written along the vertical dimension and the data tracks are spaced apart along the longitudinal dimension.

6. The data storage device as recited in claim 2, wherein while the magnetic tape remains stationary the control circuitry is further configured to control the second and third actuators to write a plurality of substantially arcuate data tracks in the first frame, wherein an arc of each data track is written along the longitudinal dimension and the data tracks are spaced apart along the vertical dimension.

7. The data storage device as recited in claim 1, wherein while the magnetic tape remains stationary the control circuitry is further configured to control the second and third actuators to write a plurality of substantially concentric data tracks in the first frame.

8. The data storage device as recited in claim 1, wherein while the magnetic tape remains stationary the control circuitry is further configured to control the second and third actuators to write at least one spiral data track in the first frame.

9. The data storage device as recited in claim 1, wherein while the magnetic tape remains stationary the control circuitry is further configured to:
control the second actuator to move the first head along a length of a first data track in the first frame in order to access the first data track; and
control the third actuator to seek the first head from the first data track to a second data track in the first frame.

10. The data storage device as recited in claim 1, wherein the control circuitry is further configured to:
control the first actuator to rotate the reel for a second interval in order to expose a second frame of the magnetic tape to the first head; and
while the magnetic tape remains stationary, control the second and third actuators to actuate the first head in the first and second dimensions over the magnetic tape in order to access the second frame of the magnetic tape.

11. The data storage device as recited in claim 1, further comprising a dedicated servo surface comprising servo data and a second head configured to read the servo data from the dedicated servo surface, wherein the control circuitry is further configured to control the second actuator and the third actuator based on the servo data.

12. A data storage device comprising:
a magnetic tape;
at least one reel;
a first actuator configured to wind the magnetic tape around the reel;
a first head configured to access the magnetic tape;
a second actuator configured to actuate the first head over the magnetic tape in a first dimension;
a third actuator configured to actuate the first head over the magnetic tape in a second dimension; and
control circuitry configured to:
control the first actuator to rotate the reel for a first interval in order to expose a first frame of the magnetic tape to the first head, wherein the first frame comprises a first plurality of data tracks;
control the second actuator to move the first head along a length of a first data track in the first frame in order to access first data track; and
control the third actuator to seek the first head from the first data track to a second data track in the first frame.

13. The data storage device as recited in claim 12, wherein the first dimension is a longitudinal dimension along a length of the magnetic tape and the second dimension is a vertical dimension along a width of the magnetic tape.

14. The data storage device as recited in claim 13, wherein the first plurality of data tracks comprise substantially linear data tracks, wherein each data track is written along the longitudinal dimension and the data tracks are spaced apart along the vertical dimension.

15. The data storage device as recited in claim 13, wherein the first plurality of data tracks comprise substantially linear data tracks, wherein each data track is written along the vertical dimension and the data tracks are spaced apart along the longitudinal dimension.

16. The data storage device as recited in claim 13, wherein the first plurality of data tracks comprise substantially arcuate data tracks, wherein an arc of each data track is written along the vertical dimension and the data tracks are spaced apart along the longitudinal dimension.

17. The data storage device as recited in claim 13, wherein the first plurality of data tracks comprise substantially arcuate data tracks, wherein an arc of each data track is written along the longitudinal dimension and the data tracks are spaced apart along the vertical dimension.

18. The data storage device as recited in claim 12, wherein the first plurality of data tracks comprise substantially concentric data tracks.

19. The data storage device as recited in claim 12, further comprising a dedicated servo surface comprising servo data and a second head configured to read the servo data from the dedicated servo surface, wherein the control circuitry is further configured to control the second actuator and the third actuator based on the servo data.

20. A data storage device comprising:
a magnetic tape;
at least one reel;
a head configured to access the magnetic tape;

a means for rotating the reel for a first interval in order to expose a first frame of the magnetic tape to the head, wherein the first frame comprises a first plurality of data tracks;

a means for moving the head in a first dimension along a length of a first data track in the first frame in order to access the first data track; and a means for seeking the head in a second dimension from the first data track to a second data track in the first frame.

* * * * *